United States Patent [19]
Cecil et al.

[11] Patent Number: 5,896,215
[45] Date of Patent: Apr. 20, 1999

[54] MULTI-CHANNEL SYSTEM WITH MULTIPLE INFORMATION SOURCES

[76] Inventors: Kenneth B. Cecil, 25 Knowllcrest Rd., Hillsborough, Calif. 94010; Charles A. Walton, 19115 Overlook Rd., Los Gatos, Calif. 95030

[21] Appl. No.: 08/612,399

[22] Filed: Mar. 7, 1996

[51] Int. Cl.$^6$ .................. H04B 10/10; H04J 14/08
[52] U.S. Cl. .................. 359/172; 359/133; 359/137; 359/144; 359/159; 359/161
[58] Field of Search .................. 359/132, 133, 359/137, 142, 143, 144, 159, 172, 161

[56] References Cited

U.S. PATENT DOCUMENTS

| | | | |
|---|---|---|---|
| 3,330,955 | 7/1967 | Barecki et al. | 359/172 |
| 4,163,123 | 7/1979 | Brodsky et al. | 359/172 |
| 4,229,829 | 10/1980 | Grunwald | 359/172 |
| 4,633,498 | 12/1986 | Warnke | 381/23.1 |
| 4,648,131 | 3/1987 | Kawaguchi et al. | 359/172 |
| 4,977,619 | 12/1990 | Crimmins | 359/125 |
| 5,020,155 | 5/1991 | Griffin | 455/617 |
| 5,079,640 | 1/1992 | Gfrerer | 359/144 |
| 5,144,294 | 9/1992 | Alonzi et al. | 340/825.45 |
| 5,253,095 | 10/1993 | Menadier et al. | 359/172 |
| 5,305,132 | 4/1994 | Fasen et al. | 359/172 |
| 5,455,702 | 10/1995 | Reed et al. | 359/159 |
| 5,633,742 | 5/1997 | Shipley | 359/137 |

OTHER PUBLICATIONS

Acousti Guide System, Popular Science, Jul. 1995.
Pulse Modulation, From Reference Data for Radio Engineers Sixth Edition, pp. 23–13 to 23–15.

*Primary Examiner*—Leslie Pascal

[57] ABSTRACT

At each booth there is, at an elevated position, an infra-red transmitter. The infra-red serves as a carrier for multiple audio messages. The audio messages are in various languages, and each language has a supplementary message of greater detail. The attendee carries an infra-red receiver, from which he selects whatever language he desires. He also has a button which, when he chooses, brings in a supplementary message in the same language. The attendee points his receiver towards the booth of interest. Thus he chooses the booth and generally neighboring booths do not interfere, as they would with radio frequency transmission. The receiver may be hand held, held next to the ear, badge level mounted, or head mounted. To reduce the time an attendee has to wait before his message starts, identical broadcasts are made cyclically at differing time intervals, and the system automatically picks the time slot most suitable for starting a message at the beginning, so only minimum time is consumed waiting for the start. The transmitting beam width, and the receiver capture angles, are adjustable to reject cross-talk between neighboring transmitting and receiving stations.

4 Claims, 13 Drawing Sheets

Narrow Angle Reception

Figure 2. Block Diagram of Multi-channel Multi-user Multi-message Transmitting System Figure 3. Attendee Hand Held Unit    Docket ID126

Inventors: Walton/Cecil

Figure 4. Attendee Hand Held Unit Block Diagram

Figure 5. Avoiding Waiting for a Cyclical Message to Repeat, Means for
Docket ID126
Inventors: Walton/Cecil Figure 6. Attendee Unit, Badge Version
Inventors: Walton/Cecil            Docket ID126

Figure 7. Attendee Unit with Pointing Chosen by Head and Eye Position

Figure 8. Rejection of Unwanted Pulses by Voltage Level and by Time Position

Docket ID126

Inventors: Walton/Cecil

Figure 10. Narrow Angle Reception

Figure 9. Wide Angle Reception

Figure 11. Attendee Unit with Dual Angle Reception

Figure 13. IR Transmitter with Narrow Transmitting Beam, front view

Docket ID126

Figure 12. IR Transmitter with Broad Transmitting Beam, front view

Inventors: Walton/Cecil

MULTI-CHANNEL SYSTEM WITH MULTIPLE INFORMATION SOURCES

BACKGROUND AND PROBLEM

At conventions multiple suppliers provide multiple selections of products to multiple attendees and prospective users. Problems occur which interfere with efficient display and communications. One of these is the language barrier, particularly at international trade shows. Not all speak English and not all are fluent. Signs can be posted in several languages, but this is not as effective as a verbal message in the attendees native language. Another problem arises when the convention is heavily attended, and the attendee cannot get close to the booth to read or to converse. Another difficulty is that some attendees want only superficial information and others wish to get information in depth. A method of presorting and pre-selection of the audience is desirable, as provided in this invention. Short range radio transmission to local attendees has the disadvantage that neighboring booths or booths on parallel aisles will interact and interfere with one another. Museum display and automatic warehousing have similar problems. Interfering signals and noise interference are minimized by use of digital information transmission and modulation techniques.

SUMMARY DESCRIPTION

At each information source or booth there is, at an elevated position, an infra-red transmitter. The infra-red serves as a carrier for multiple audio messages on multiple sub-carriers. The audio messages are in various languages, and each language has a supplementary message of greater detail. The "attendee," who is also referred to as a "user" or a "viewer" carries a small infra-red receiver, from which he selects whatever language he desires. The also has a button which, when he chooses, brings in a supplementary message in the same language. The attendee points the receiver towards the booth of interest. Thus the attendee can browse through a number of booths, and get the primary information while standing in the aisle, and get secondary information if desired, and decide whether he wishes to approach the both for more information, or simply pass on. Pointing of the receiver may be by hand, or by chest mounting, or by head band mounting. Neighboring booths do not interfere, as they would with radio frequency transmission. Another advantage over radio frequency is that the transmitter and receiver are quite simple, and government restrictions for radio frequencies are not generally a problem. To reduce the time an attendee has to wait before his message starts, identical broadcasts are made cyclically at differing time positions, and the system automatically picks the time slot most suitable for starting a message at the beginning, so only minimum time is consumed waiting for the start. To reduce problems of cross talk from multiple transmitters, digital modulation is used, with threshold amplitude and temporal signal detections Interfering signals and noise interference are minimized by use of digital information transmission and modulation techniques, similar to those used in high density digital television and digital audio transmission.

PRIOR ART

1. U.S. Pat. No. 5,020,155, to Robert Griffin, assigned to Heritage Communications, titled "Audio Commentary System".

2. U.S. Pat. No. 4,663,498, to Warnke, assigned to Sennheiser Electronic KG, Wedemark, Germany, titled "Infra-red Headphones for the Hearing Impaired."

3. Acousti-guide System, of New York, N.Y. Brochure is attached.

4. Pulse Modulation, from Reference Data for Radio Engineers, Publisher ITT, pages 23–13 to 23–26.

There are comparative remarks on the prior art near the end of the Description.

DETAILED DESCRIPTION

Figure 1:
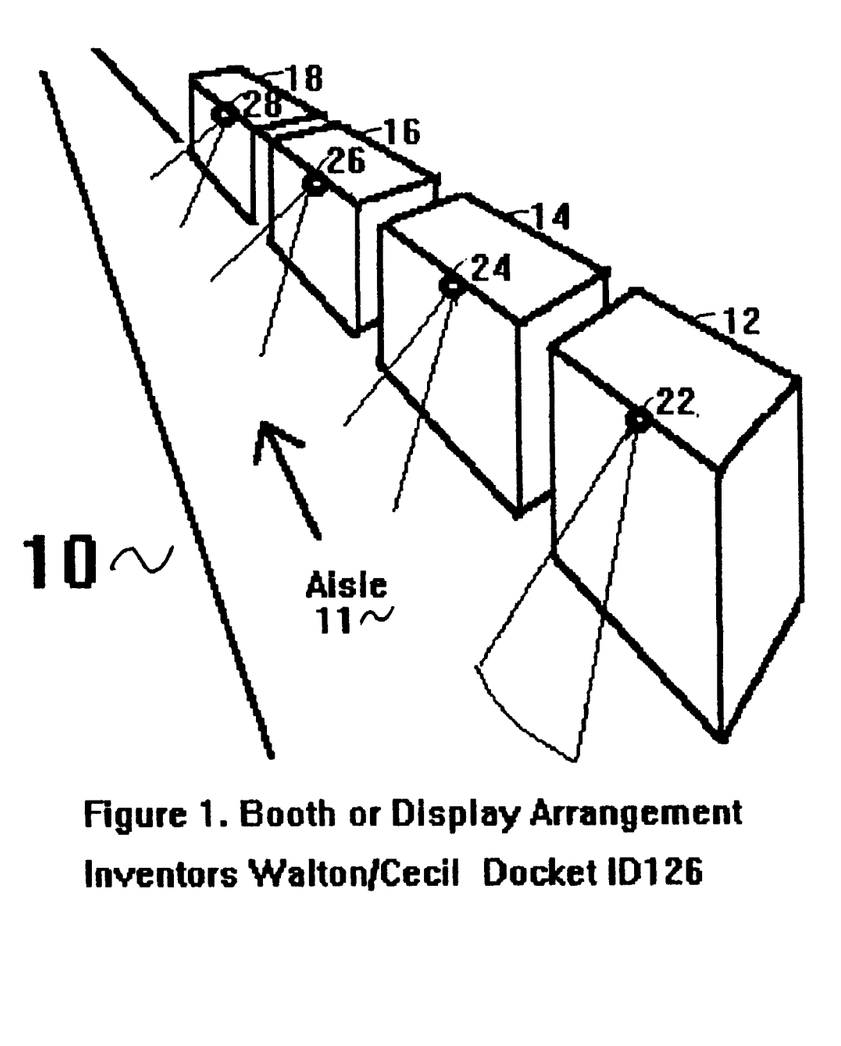
FIG. 1 shows the Booth Display Arrangement and the Infra-red Radiation Pattern

FIG. 1 shows the general arrangement 10 of booths and aisles which occurs at conventions. There is a series of booths 12, 14, 16, 18, etc. along an aisle 20. There are usually opposing booths along the other side of the aisle 20. At an elevated part of the booth, roughly centered, usually associated with some identifying logo of the company, there is an infra-red transmitter 22, also 24, 26, and 28. The infra-red transmitters radiate a beam covering the front of the booth and carry messages to receivers 80, shown in FIG. 3, which are carried by attendees in the aisle 20.

Figure 2:
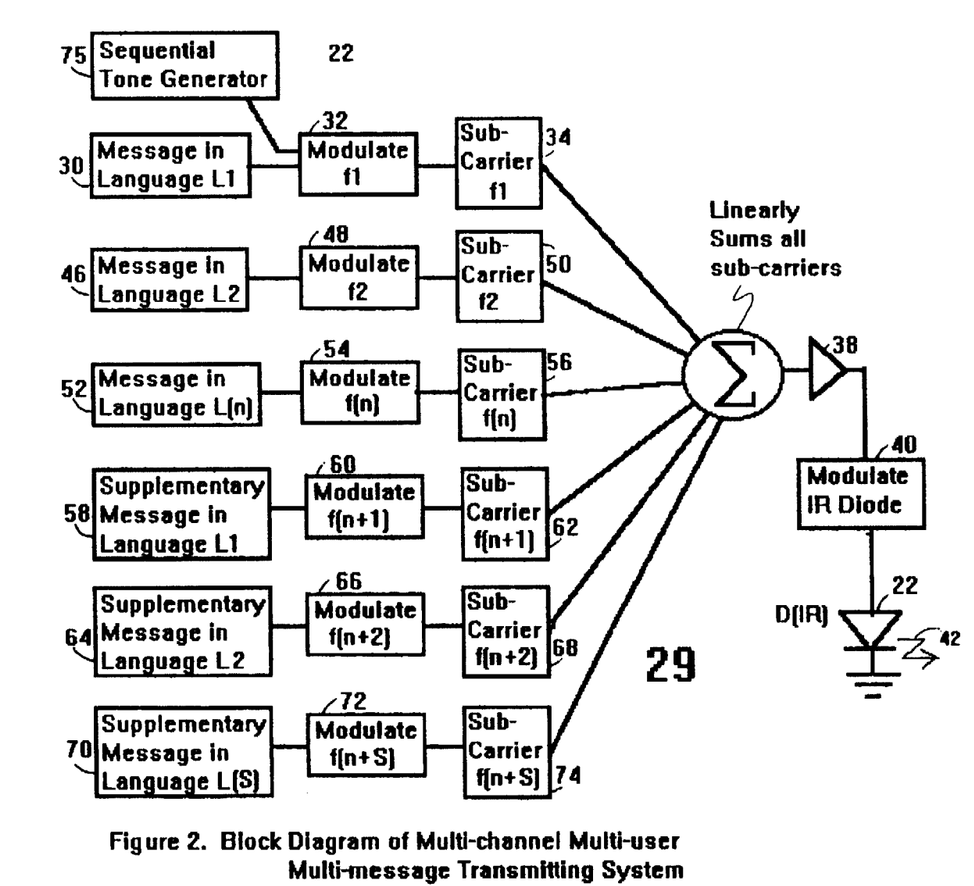
FIG. 2 shows the Block Diagram of the Multi-channel Multi-message Transmitting System.

In FIG. 2 is shown the block diagram of the electronic system 29 which controls the intelligence radiated from infra-red IR transmitter 22. There is first an audio message L1, typically in voice form, although it may be music or digits, which is stored in and retrieved from storage element 30. The message from storage 30 is cyclically brought out and sent to modulator 32. There is a sub-carrier generator 32 which generates a sub-carrier frequency f1. Modulator 32 modulates the frequency f1 with the message from storage 30. The modulated f1 signal is sent to a summing device 36, and then to amplifier 38 and then to IR modulator 40. Modulator 40 modulates the radiation 42 from infra-red diode 22. The signal 42 from the IR diode 22 is infra red radiation 42 with an amplitude fluctuation in accordance with the fluctuations in the output of summing device 36.

Amplitude modulation, as just referenced, is an established method for modulating with analog voice signals. Alternatively, there are advantages to digital modulation, such as noise rejection, and these are discussed in the description of FIG. 8. Modulation, also referred to as digital modulation, takes several forms. These are: pulse width modulation, or PWM; pulse position modulation or PPM; and pulse code modulation, or PCM.

Referring further to FIG. 2, there is a message L2 stored in storage element 46. Message L2 is in some instances the same identifying message as L1 but in a different language, or it may be the same message in a different time slot. The message from storage element 46 passes to modulator 48. A sub-carrier frequency generator 50 generates sub-carrier frequency f2. Modulator 48 modulates the sub-carrier frequency f2. The resulting signal is sent to summing device 36, and hence to modulator 40, diode 22, and infra-red beam 42. Thus a second signal is placed on the infra-red beam, with a different sub-carrier frequency. Similarly, message L(n) from storage element 52 travels via modulator 54 and sub-carrier generator 56 and summing device 36 and introduces additional intelligence into infra-red beam 42.

Referring yet further to FIG. 2, note that there is second set of storage elements, 58, 64, and 70. These are labeled "supplementary messages" and generally represent supplementary information for the interested user, also referred to as an attendee, as described later in FIG. 3. These supplementary messages have electronic paths identical in structure to those for 30, 46, and 52, and use modulators 60, 66, and 72, to modulate sub-carriers 62, 68, and 74, respectively, with sub-carrier frequency values: n, n+1, and n+S. All place additional intelligence in the final infra-red output signal 42.

Figure 3:
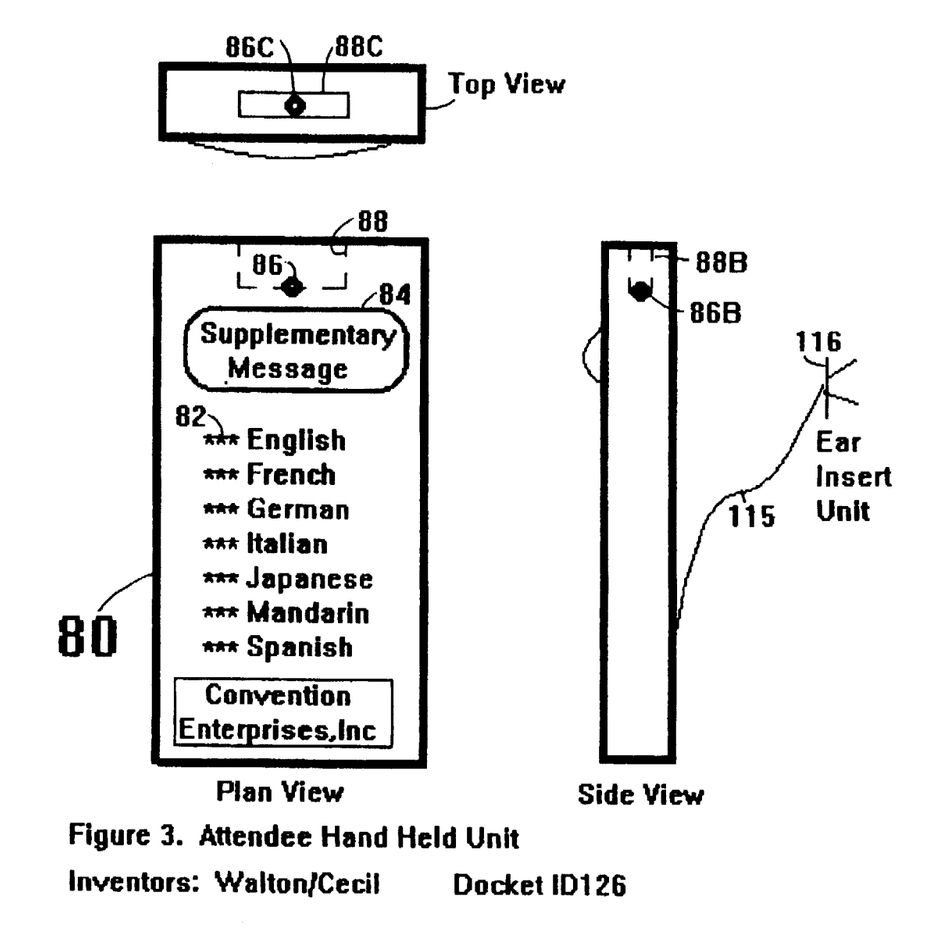
FIG. 3 shows the Attendee Hand Held Unit.

FIG. 3 shows the plan, side, and top view of the attendee unit 80, also referred to as the user unit 80. There are controls 82 on the face which allow selection of the preferred language, of which seven are indicated. There is a button 84 and 84B which allows the attendee to request supplementary information. At one end is the infra-red receiving diode 86, also identified as 86B and 86C. The diode 86 is slightly countersunk by placing it in slot 88 to provide a directional quality to the reception, that is, when the unit is pointed at the desired booth, signals from undesired booths are less likely to enter because they are shielded out. Further, the inside of slot 88 is coated with a special coating 89, which absorbs infra-red radiation. Coating 89 is typically based on a black high-carbon pigment, with binder, which behaves similarly to the coating applied to the surfaces of the "stealth" bomber. Radiation from undesired angles is absorbed, and does not reflect off the sides and reach the infra-red detector 86. A similar coating is applied to the slots and guidance tubes shown later in FIGS. 6 and 7.

The diode 86 may also be placed in the front surface of the attendee unit, as discussed later under FIG. 6. The Attendee Unit 80 useful output is via connector wire 115 to an earphone 116, also referred to as an ear plug speaker 116.

Figure 4:
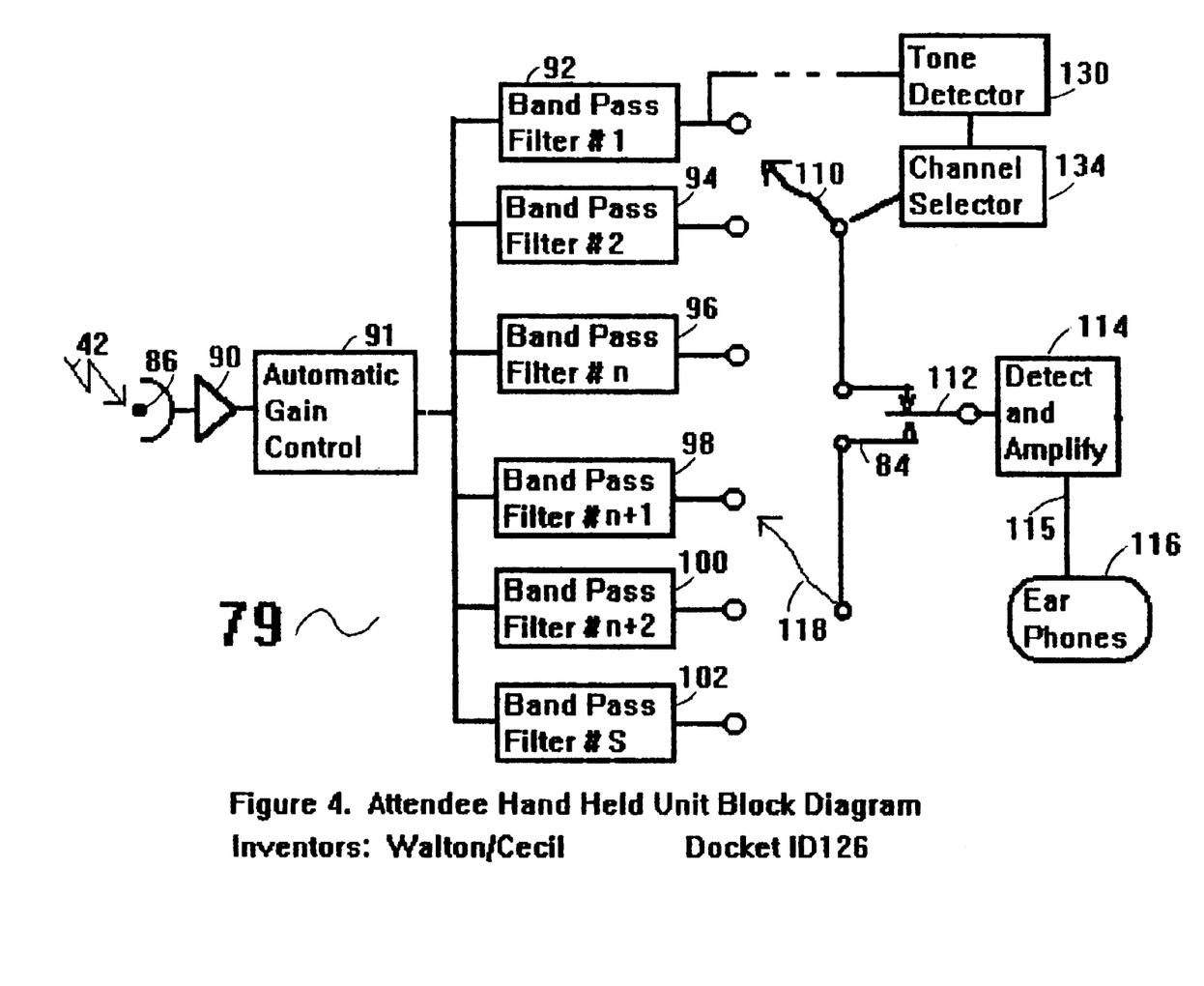
FIG. 4 shows the block diagram of the Attendee Hand Held Unit

FIG. 4 shows the block diagram 79 of the Attendee Unit 80. First the infra-red beam 42 impinges on receiving diode 86 or the photo cell equivalent. There is an amplifier 90 followed by automatic gain control device 91. Auto gain control 91 is needed because the unit operates over a wide variety of distances and signal strengths, and excess amplification could lead to serious distortion and cross talk and consequent loss of data. The output of amplifier 91 feeds an ensemble of band pass filters, 92 to 102. Each of the band pass filters is set to respond to one of the sub-carrier pass frequencies introduced in FIG. 2. The modulated signal of each sub-carrier appears at the outputs of the band pass filters. Switch 110 corresponds in its setting to the language selected by switch bank 82, shown in FIG. 3. Switch 110 selects which band pass filter output signal will be passed to the next stage. The next stage is switch 1 12. Switch 112 selects whether the upper or lower set of band pass filters are selected. From 112, the signal, still in carrier form, is brought to detector/amplifier 114. Detector 114 removes the carrier and its output audio signal is in the selected language. The audio signal travels over wire 115 to the earphone 116.

Switch 112 is drawn in the position for selecting the upper set of band pass filters, namely 92 through 96. This is generally the initial and primary message position. If the supplementary message information switch 84 is pressed, switch 112 is commanded to the down position, and another set of band pass filters, namely 98 through 102, is selected. The attendee/user then receives the supplementary messages sent from storage 58, 64, and 70. Switch 118 determines which one of the supplementary messages is received. In a typical convention situation, switch 118 will be "ganged" or interlocked, mechanically or electronically, to switch 110, so that the supplementary message will be in the same language as the primary message. In other applications, the switches are not ganged.

Another feature which is desirable is that when the user wants to hear a message, there should only be a minor delay before the start of the message, or, in other words, the user should not pick up a message in its middle or some part other than the beginning, nor should there be a wait for the message to complete its present cycle. It is undesirable, for example, to hear the second half before the first half.

Figure 5:
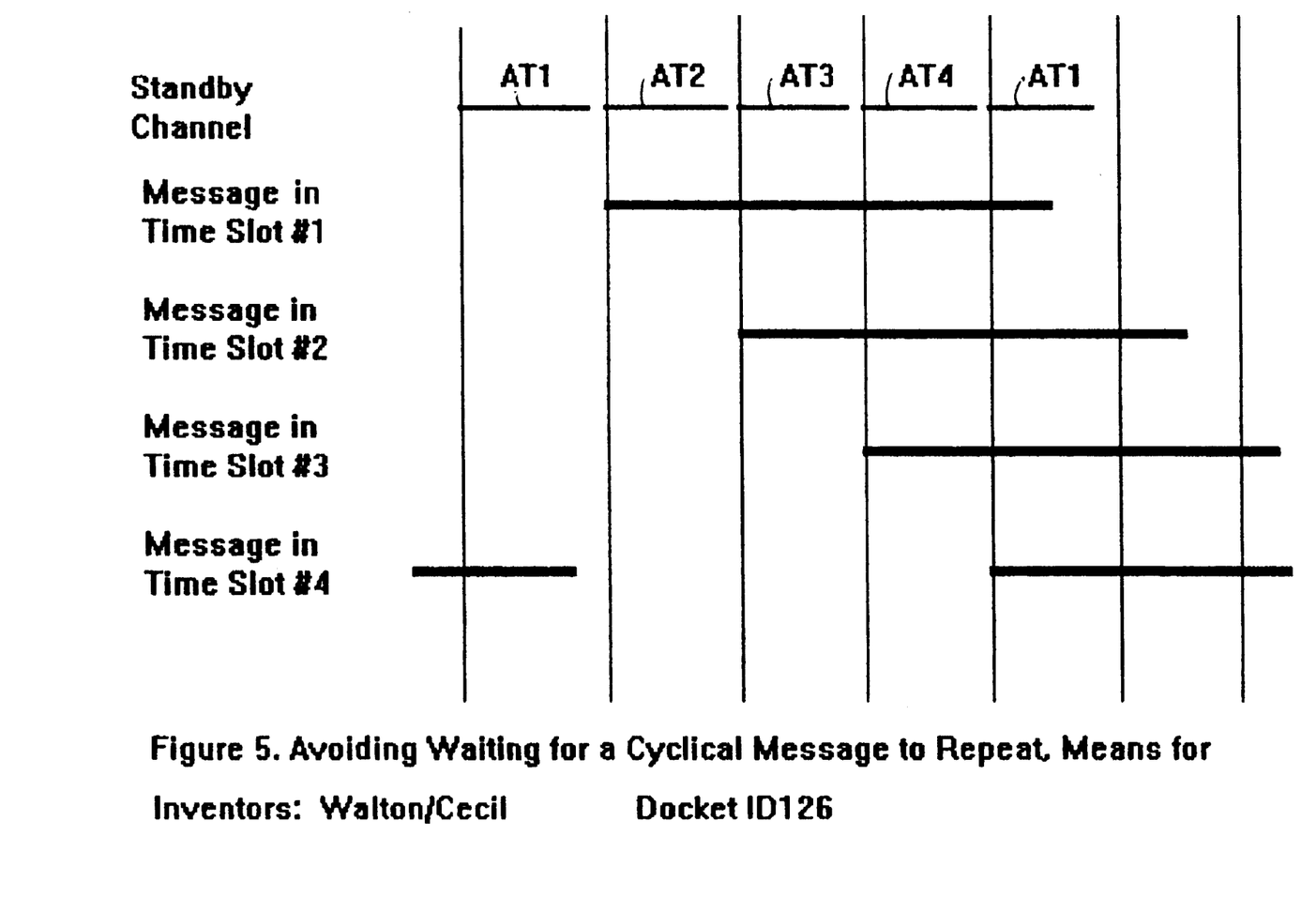
FIG. 5 shows a means for Avoiding Waiting for a Cyclical Message to Repeat

To overcome these problems, a timing arrangement as shown in FIG. 5, and implemented in FIGS. 2 and 4. In FIG. 2, the first channel, designated as f1, is connected to a sequential tone generator 75. The audio tones are AT1, AT2, AT2, AT3, and AT4, sequentially generated, as shown in FIG. 5. In this configuration of the system, the information stored in registers 46, 52, 58, and 64 all contain the same basic message, all in English for example, but at four different time positions, designated Time Slot #1, Time Slot #2, etc. The first channel in the receiver, shown in FIG. 4, designated as using sub-carrier frequency f1 and using band pass filter 92, is permanently connected to an Audio Tone Detector 130. Referring to FIG. 5, if the tone detector 130 hears audio tone AT1, then the channel selector 134 commands switch 110 to select the message coming from band pass filter 94. The message in band pass filter 94 uses carrier frequency f2 and the message originated in storage register 46. Storage Register 94 has been allocated the English language message in its first time position, designated Time Slot #1. At the conclusion of audio tone AT1, and at the beginning of audio tone AT2, the audio channel to the earphone is turned on, and the attendee then hears this English language message from its beginning.

Similarly, the message in storage register 52 has been programmed to be the same English language message, but in time position 2, designated Time Slot #2. The message in storage register 58 is programmed to be the same English language as in Time Slots 1 and 2, but is delayed in time, and is designated as being in Time Slot #3.

Similarly, if the Tone Detector 130 hears audio tone AT2, then the next available full message is selected to come from Band Pass filter 92, which responds to the message which originated in storage register 52, which has stored in it an English message representing Time Slot #2. The remaining audio tones are similarly recognized and select the next available full message. Although four are shown, the principal can be extended indefinitely to provide finer time selection, and multiple languages and multiple supplementary messages.

Figure 6:
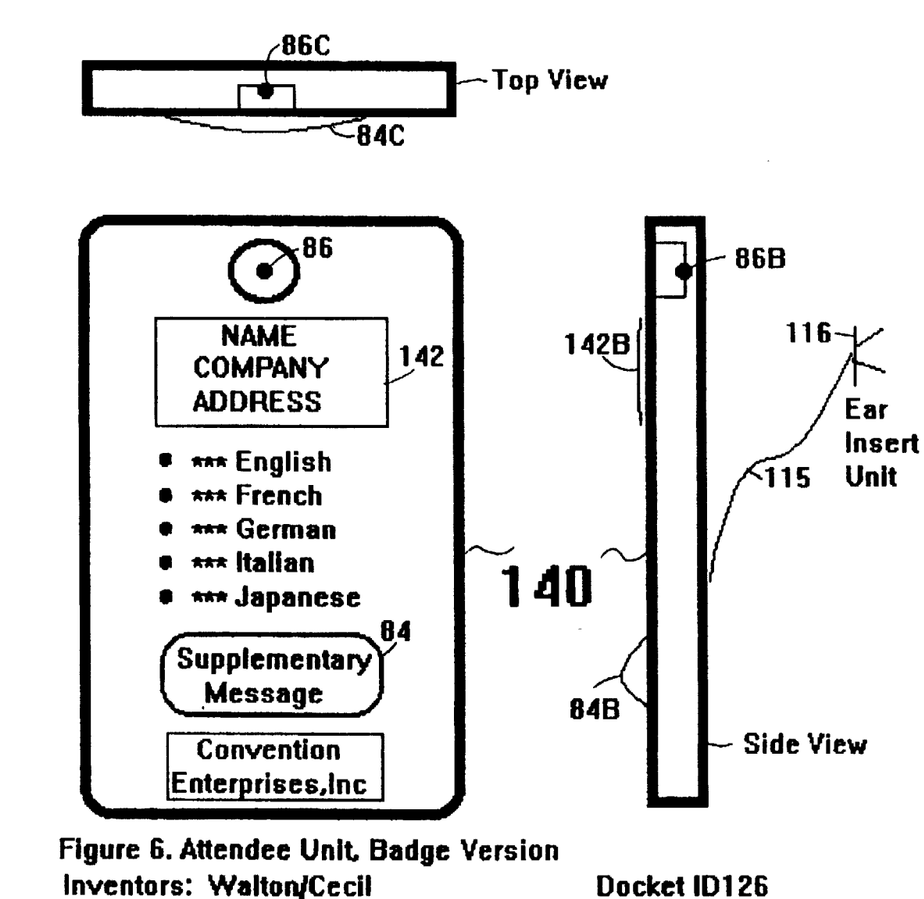
FIG. 6 shows an alternative Attendee Unit in the form of a Badge.

A Badge Version 140 of the Attendee Unit is shown in FIG. 6. In this version the infra-red detector 86 is carried in a badge configuration. The badge is typically clipped high on the chest of the attendee, also referred to as the user, and bears the typical designations 142 of name, company, and usually home address. The name information is carried on a card which slides into a receptacle 142 on the badge. The attendee presents his body towards the selected display booth of interest, for example booth 12. The infra-red beam 42 from the booth 12 is received and detected by the badge unit 140. A slender wire 115 connects the audio information to the ear phone 116 worn by the attendee. Supplementary messages are received as described in FIG. 3 by pressing the Supplementary Message button 84.

Figure 7:
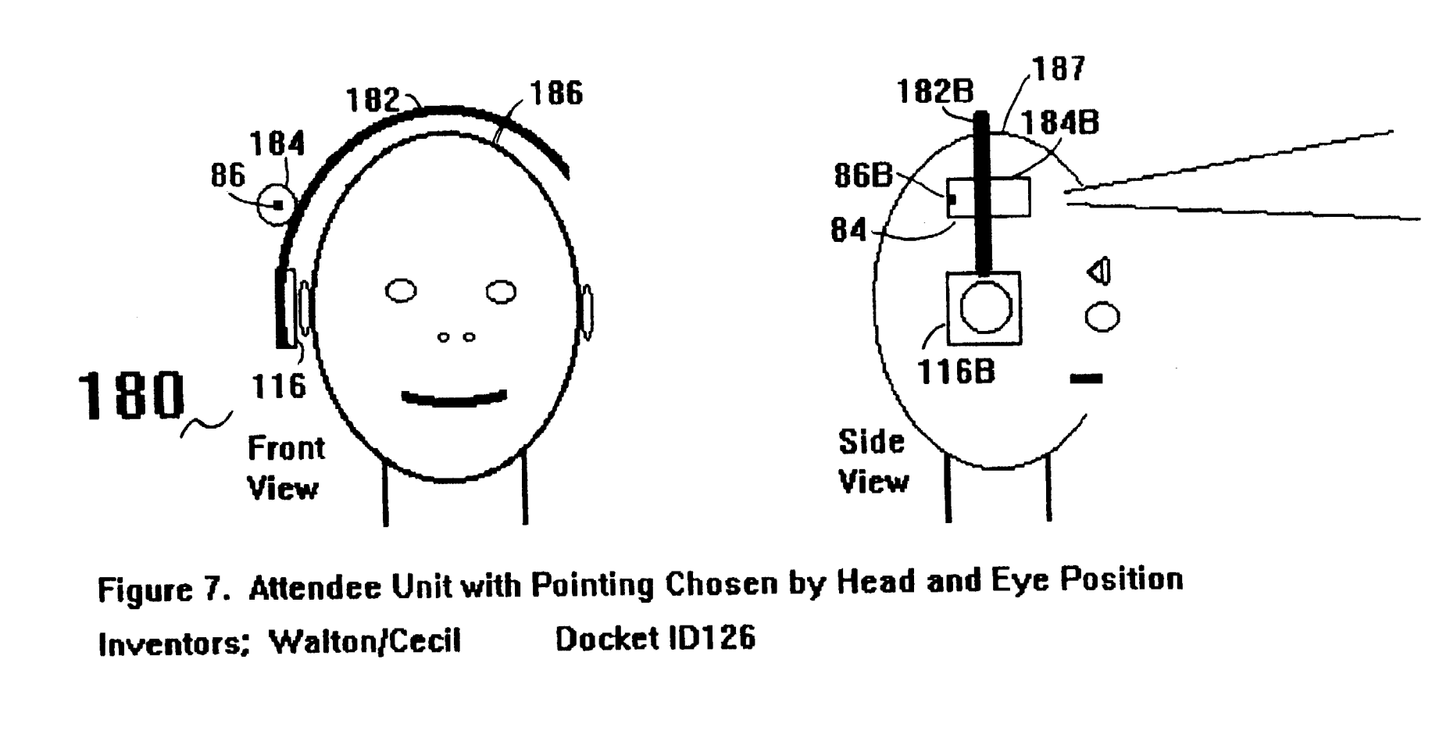
FIG. 7 shows an alternative Attendee Unit with Pointing Chosen by Head and Eye Position

A Head Mounted Version 180 of the Attendee Unit is shown in FIG. 7. The receiver unit 79 and the infra red detector 86 are mounted on a typical earphone head band 182. The head band is place over the front view head 186. The side view head is 187. The earphone 116 is mounted adjacent to the ear. The infra-red detector 86 is mounted in a short tube 184 which is also mounted on the head band 182. The Attendee then receives the transmission from the booth 12 at which he is looking. Booth selection is accomplished automatically by the head 186 (and 187) pointing direction, which is generally the same direction in which the eyes are pointing. Also mounted on head band 182 for convenient finger manipulation are the previously described switch 82 for language selection and supplementary switch 84 for choosing supplementary information.

Figure 8:
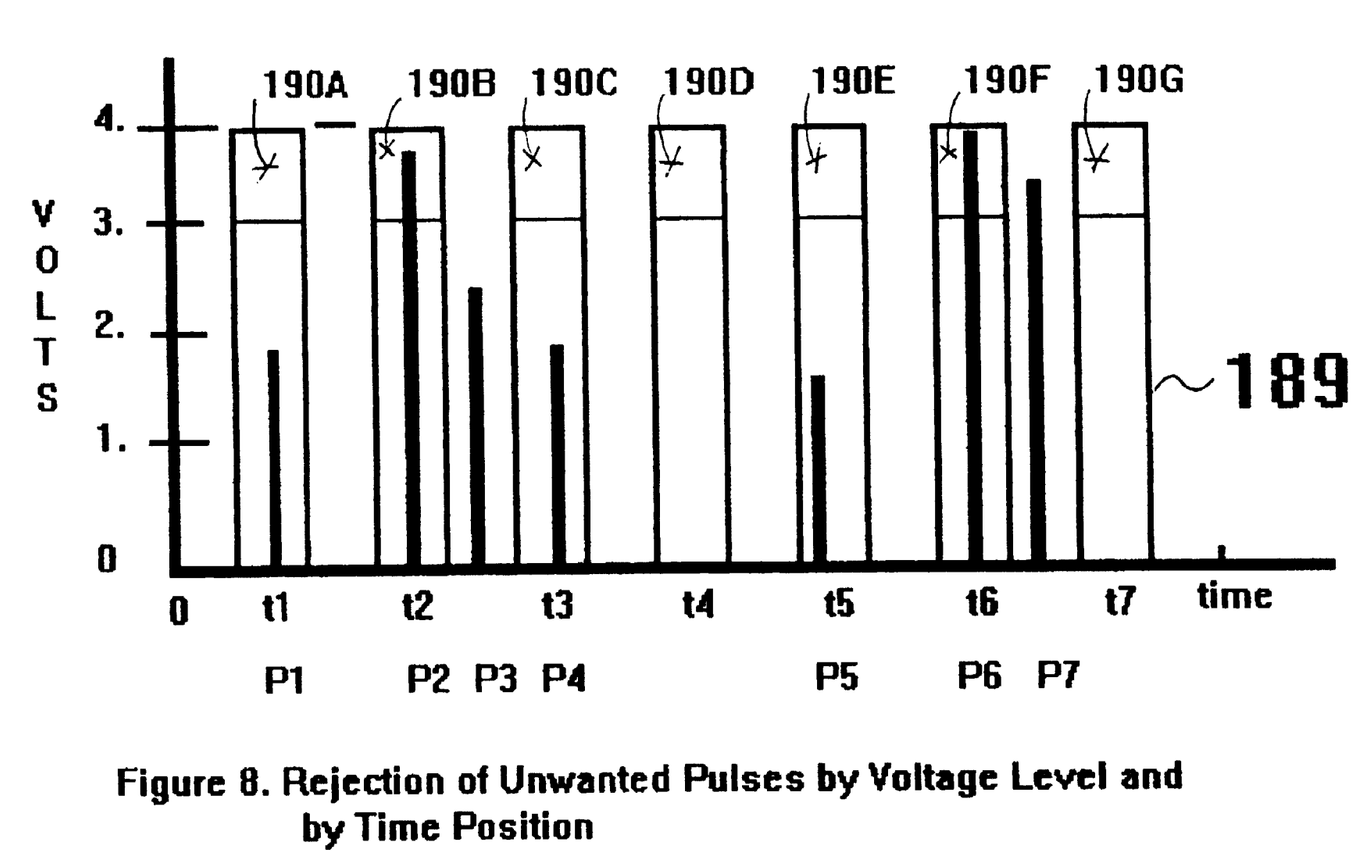
FIG. 8 shows use of Digital Techniques to Reject Unwanted Signals

FIG. 8, also designated as plot 189, shows rejection of unwanted signals using digital techniques. The two rejection techniques are amplitude discrimination and time position discrimination. First, the AGC stage brings the peaks of incoming signals to a certain specified voltage level, for example four volts. An unwanted signal from a neighboring transmitter may be present, but this voltage will typically be somewhat less, perhaps two volts peak. FIG. 8 illustrates the relative amplitudes encountered. Without precautions, this neighboring signal of fractional amplitude would be heard by the user as a distracting audio commentary, analogous to background conversation at a cocktail party. For reception clarity and noise rejection precaution, the circuits are designed to respond only to voltages between three and four volts, and not two volts. Therefore the primary signal of 4 volts is heard, and the secondary (two volt) signal is not heard.

Further, time slot (temporal) rejection is also employed, as follows. A phase locked oscillator is automatically synchronized by the dominant incoming signal. This oscillator opens a listening window at the regular intervals established by the dominant repetition rate. This window is indicated in FIG. 8 by time slots t1, t2, t3, etc. Neighboring transmitters will have slightly different digital transmission rates. Incoming signals which fall in the intervals between pulses, or fractionally between, will be rejected, whereas those in step will be accepted. The result is further rejection of unwanted neighboring signal transmission.

The acceptance regions are shown in FIG. 8, also designated plot 189, and are designated 190A, 190B, through to 190G. Signals outside these regions are rejected.

Refer again to FIG. 8. Specific examples of rejection of unwanted signals: Shown are 7 time windows, t1 to t7. The phase locked oscillator establishes these windows. Example pulses are shown. First, P1, is too small, less than three volts, and is ignored. P2 is above three volts and is in the time window t2, and is acknowledged as a good pulse. P3 is outside of the time window and is ignored. P4 is too small. P5 is too small. P6 is an acknowledged pulse. P7 is in the wrong time position. The two good pulses, P2 and P6, are used to resynchronize the phase locked oscillator, and reset the automatic gain control, and are used as part of the valid message. Note that noise and unwanted pulses have been rejected.

Furthermore, the bit rates of neighboring transmitting sources, also referred to as transmitting stations, are chosen to be slightly different, thus further preventing an unwanted source from causing background interference with the dominant selected source.

The beam width of the infra red signal 42 is controlled for both transmitting and receiving. The receiving angle is also referred to as "wide" or "narrow" angle reception, or as "capture angle". Also, the receiving angle is pointed upwards at approximately 45 degrees, to optimize reception from the IR beam, which typically originates from a support above the exhibition booth. Other applications may use a same-level or some other level beam source.

The beam width of the infra-red signal 42 is controlled for both transmitting and receiving. The receiving beam width is also described as "wide angle" or "narrow angle" reception, or as "capture angle", wide or narrow. Also, the receiving angle is typically pointed upwards at approximately 45 degrees, to optimize reception from the transmitted IR beam 42, which typically originates from a support 12 above the exhibition booth. Other applications may use a same-level or some other level beam source, with the receiver angle optimized accordingly.

Figure 9:
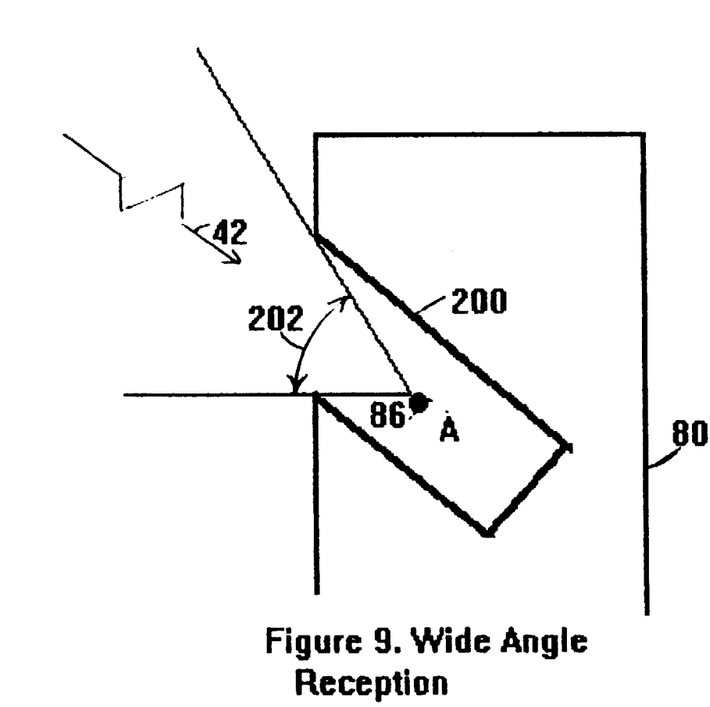
FIG. 9 shows Wide Angle Reception
Figure 10:
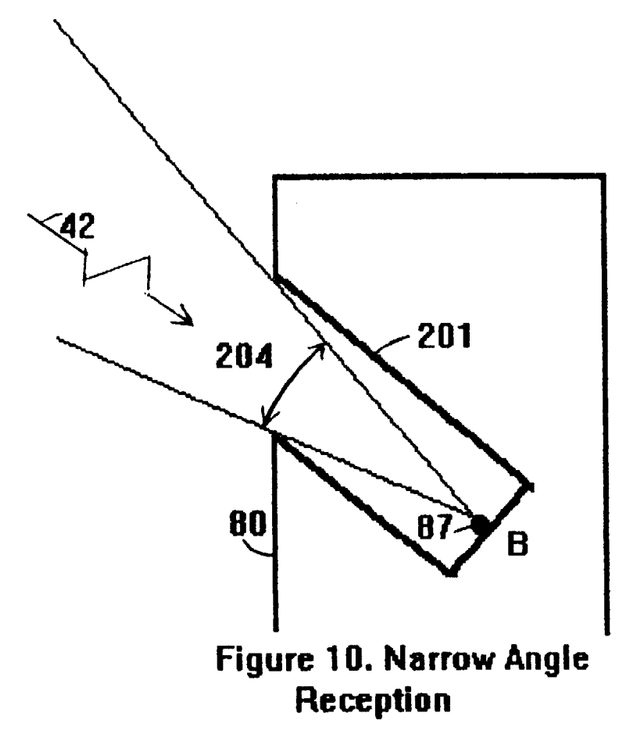
FIG. 10 shows Narrow Angle Reception

FIG. 9 shows a typical receiver beam angle control configuration, for wide angle reception. There is recess 200, pointing upwards at 45 degrees, and housing receiving IR diode 86, in position A. Note that the capture angle 202 for incoming beam 42 is relatively wide. FIG. 10 show the narrow angle configuration. The receiving diode 87 is located deep into slot 201, in position B. The receiving angle 204 for beam 42 is thus relatively narrow. This arrangement is better suited for rejecting unwanted infra-red beams, but does require more careful pointing of the receiver 80 or receiver 205. The user chooses which configuration to use, either slot 200 or slot 201, according to the level of interference encountered or the convenience of pointing.

The method of selection of slot 200 or slot 201 may be by switch, or by a cover. A preferred method of selection is to connect and use both receiving diodes ordinarily, with their signals electrically added, and then when interference is encountered to place a finger over the wide beam feature of slot 200. Then only the narrow angle receiving diode will be active, with consequent rejection of the signals or noise which is outside that angle.

Figure 11:
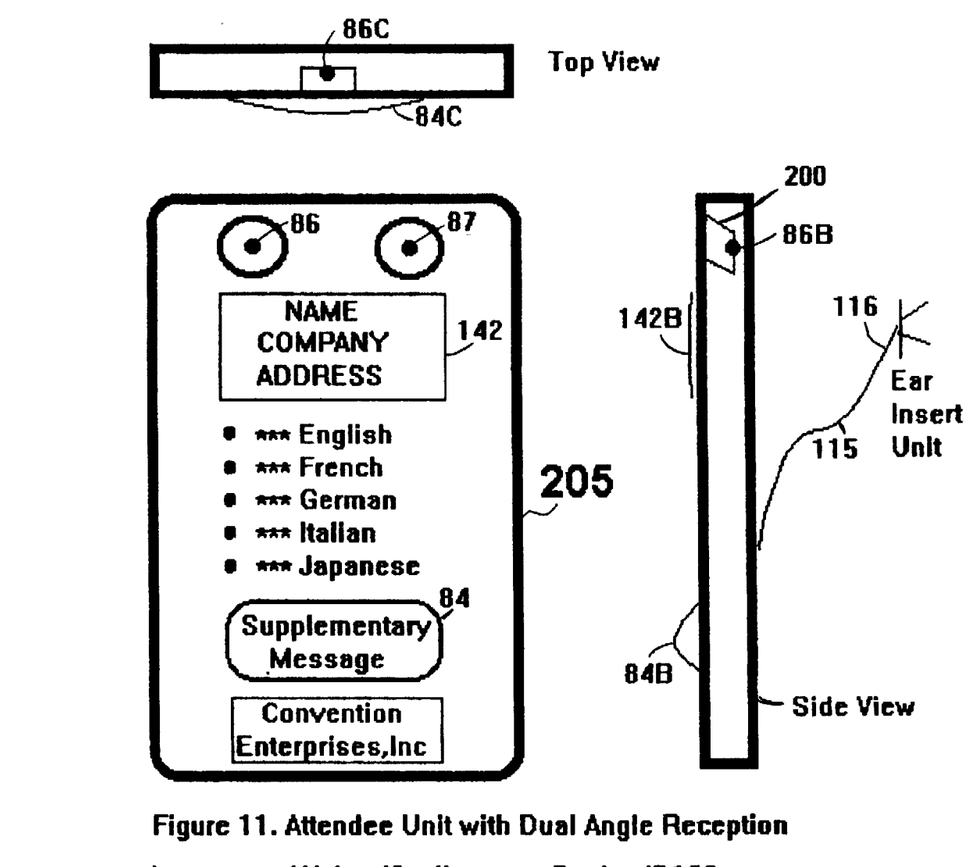
FIG. 11 shows Attendee Unit with Dual Angle Reception

FIG. 11 shows the arrangement of the Attendee Unit 205, in badge form, when two receiving angles, 200 and 201, are incorporated. The two angles are identified as 200 and 201. The user puts a finger over slot 200 when the wide angle is allowing an unwanted signal. All other features of this badge are the same as for badge 80 in FIG. 3.

Figure 12:
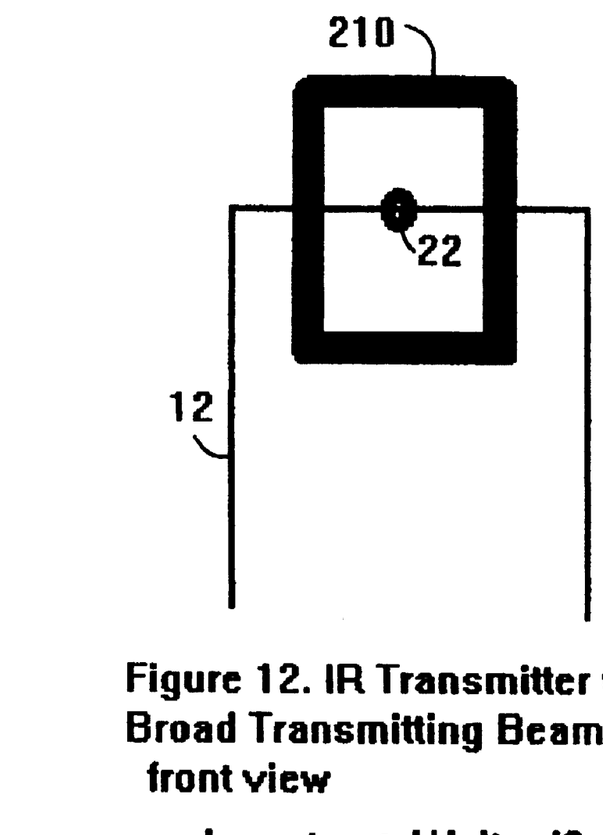
FIG. 12 shows IR Transmitter with Broad Transmitting Beam, front view
Figure 13:
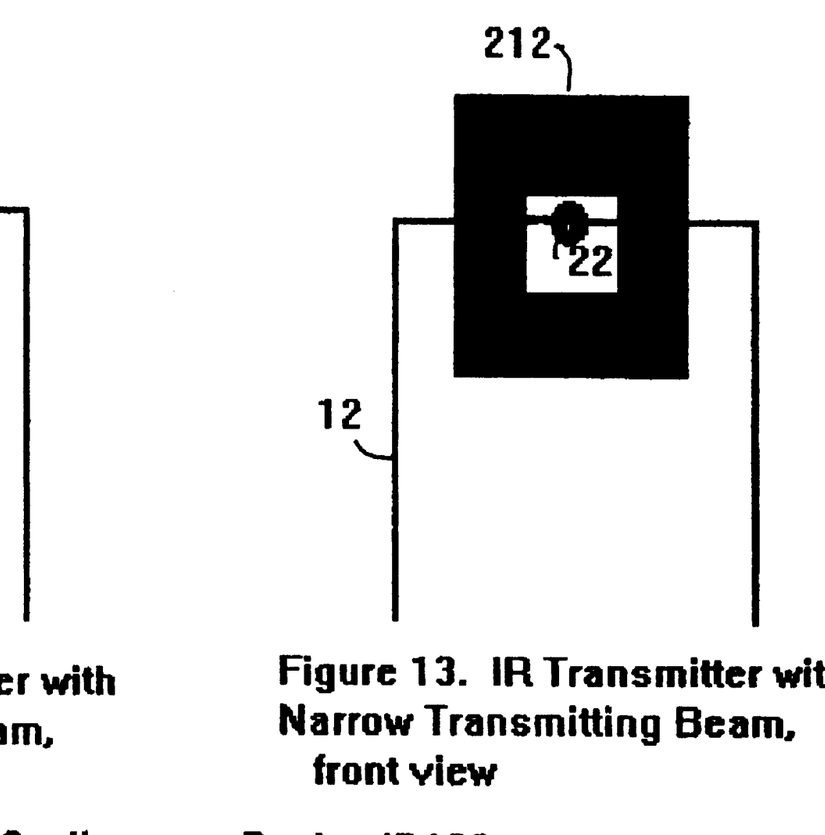
FIG. 13 shows IR Transmitter with Narrow Transmitting Beam, front view
Figure 14:
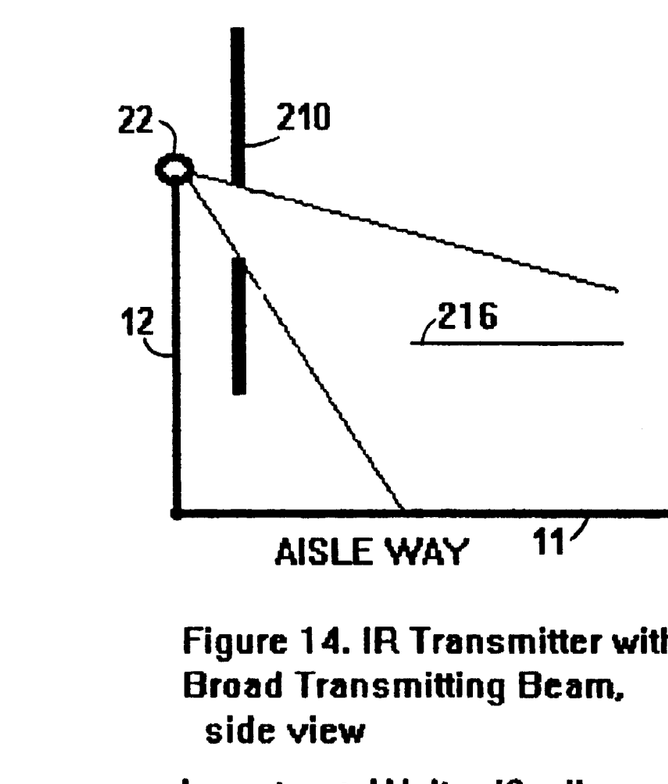
FIG. 14 shows IR Transmitter with Broad Transmitting Beam, side view

The transmitting beam angle is also controlled and adjustable, as illustrated in FIGS. 12, 13, 14, and 15. FIG. 12 shows a mask 210, which allows the radiation from IR source 22 to be fairly broadly radiated. FIG. 14 shows the side view of this same configuration. Note that the beam more than covers the aisle way 11. This wide angle is convenient for easy reception. Note, however, that if there were an exhibition booth on the other side of the aisle 11, and there were reflections of beam 42, then a receiver, although pointed towards one side, might pick up reflections of the beam 42 from the opposing side. This pickup of unwanted signals is also called "crosstalk".

Figure 15:
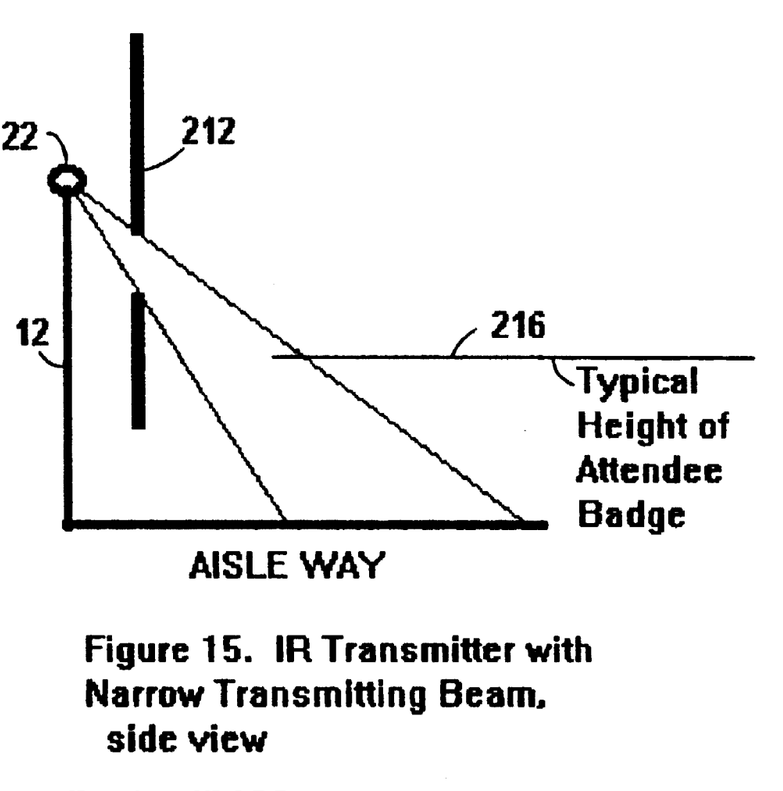
FIG. 15 shows IR Transmitter with Narrow Transmitting Beam, side view

In situations where a beam 42 from the opposite side of aisle 11, or from neighboring booths, causes interference, the radiating beam 42 is masked at a narrow beam angle. Refer to FIGS. 13 and 15, where the mask 212 limits radiation to a much smaller angle. The aperture in mask 212 is substantially smaller than that of mask 210. In FIG. 15 the beam 42 now does not reach across the aisle 11, particularly at the height 216 where the receiver 80 or 205 is typically carried. Sideways interference, or cross talk, is similarly reduced or eliminated by mask 212.

Figure 16:
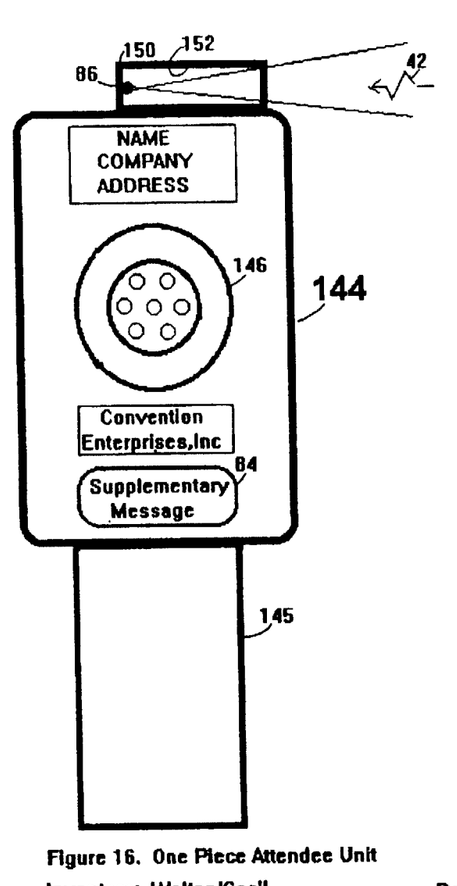
FIG. 16 shows a One Piece Attendee Unit
Figure 17:
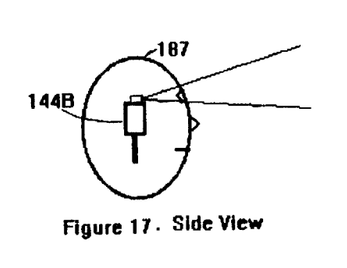
FIG. 17 shows a side view of the One Piece Attendee Unit
Figure 18:
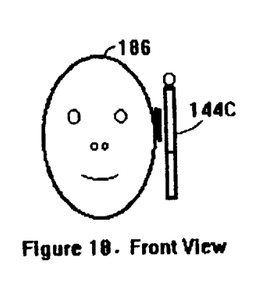
FIG. 18 shows a front view of the One Piece Attendee Unit

FIG. 16 shows a hand held attendee unit 144, called a One Piece Attendee Unit. FIG. 17 shows the side view 187 of the head using Unit 144, and FIG. 18 shows the front view 186 of the head using the Unit 144. The unit 144 resembles a cellular or cordless phone, except that it is smaller and lighter. The unit 144 comprises an earphone 146, the infra red receiver diode 86, a receiving beam tube 150 which provides selective direction capability, and the button 84 for supplementary messages, and has a handle 145. The attendees hand, not shown, holds the handle 145. In use, the attendee holds the unit 144 near his ear, and points his head 187 and the unit 144 toward the transmitting infra-red device 22, and receives the signal 42. The transmitter 22 is located above the booth or the piece of art of interest. In practice, the hand may be slightly forward of the ear, giving the unit an appropriate upward tilt. The pointing tube 150 is internally coated with non-reflecting surface 152, to avoid interfering side beams and cross talk.

PRIOR ART REMARKS

Advantages of the FIG. 16 Attendee configuration over the prior art are
1. No wire to the ear. It is a single piece unit.
2. No ear plug with possible hygienic problem.
3. Pointing is from a relatively high position, less obscured by persons between the unit and the transmitter.
4. Compared to the Acousti-guide product, no internal memory is needed, hence it is less costly. In Acousti-Guide, the memory is in the Attendee Unit, and it must be returned to the central dispatching location for a change of vendor message. In other words, in this disclosed system, changes in vendor message are controlled at any time by the vendor, at this booth, without need for tedious or costly refresh at a central point.
5. Disadvantages compared to the Acousti-guide;
5.1. Unit needs to be pointed. Since the attendee is already looking, this is probably not a problem. If poorly pointed, there may be crosstalk.
5.2. Individual booth equipment is more costly, i.e. small IR transmitter is needed compared to a posted booth number.
6. Advantages compared to the Heritage System:
6.1. No wire from hand unit to ear
6.2. Dual beam width selection

VARIATIONS

The system also has functional advantages for museums, circuses, fairs, zoos, gardens, automobile sales, food fairs, multi-ethnic restaurants, and similar events where multiple persons wish to receive multiple messages from multiple adjoining sources. The system is suitable for unattended, or minimum attendance, commercial/industrial displays, at convention centers, airports, malls, merchandise marts, chambers of commerce, manufacturing facilities, wine manufacture and distilleries, at city hall, railroad stations, and similar.

The system is also suitable for sophisticated warehousing, where groups of products are held at multiple levels in the warehouse. The infra red radiating beam will send information on the storage contents of the specific palette or cubicle, and the beam will also guide the crane or fork lift which selects the products.

Microwaves can also be beamed from booths, in lieu of infra-red. Microwave transmission and directional reception is more costly than infra-red today, but may not be I coming years. Ultrasonic sound will also accomplish these system functions.

Individual booths, also referred to as stations, or exhibits, or viewer positions, may be battery powered, so that a power line or extension cord is not needed. To minimize battery drain, the booths are set to turn off, or go "power down" when no user or viewer is present. They are turned on by either: (a) sunlight, which also recharges the batteries, or (b) artificial light, only when the exhibit hall is lighted, or (c) attendee light, when the attendee energizes a small flashlight attached to the attendee unit.

We claim:

1. A multi-user multi-channel multi-transmitter information system, comprising multiple information sources, each of said sources having a transmitter beam, each of said transmitter beams having multiple modulated channels of information;

said information being in the form of messages with each of said messages transmitted repeatedly at different overlapping times so that said channel with the most convenient time of start is selectable by said user for the convenience of said user;

and multiple receivers, each of said receivers with directional means to directionally select one of said transmitter beams, and each of said receivers with means to extract each of said modulated channels from each of said transmitter beams:

and each of said receiver means having means for demodulating each of said modulated channels;

and each of said receiver means having means to report said information to the user of the said receiver;

and each of said receiver means including means to reject spurious signals.

2. A multi-user multi-channel multi-transmitter information system, comprising multiple information sources, each of said sources having a transmitter beam, each of said transmitter beams having multiple modulated channels of data information which data transmission is by digital pulsed data, and said pulsed data being sent by said modulated channels data means at a pulse repetition rate and in which said pulse rates are chosen to be different for neighboring information sources to further reduce interaction at the receiver between transmitting sources;

and each of said receivers includes means for accepting pulses of right time position and rejecting pulses of wrong time position and multiple receivers, each of said receivers with directional means to directionally select one of said transmitter beams, and each of said receivers with means to extract each of said modulated channels from each of said transmitter beams, and each of said receiver means having means for demodulating each of said modulated channels;

and each of said receiver means having means to report said information to the user of the said receiver;

and each of said receiver means including means to reject spurious signals.

3. A multi-user multi-channel multi-transmitter information system, comprising multiple information sources, each of said sources having a transmitter beam, each of said transmitter beams having multiple modulated channels of information;

and multiple receivers, each of said receivers with directional means to directionally select one of said transmitter beams, and each of said receivers with means to extract each of said modulated channels from each of said transmitter beams, and each of said receiver means having means for demodulating each of said modulated channels;

and each of said receiver means having means to report said information to the user of the said receiver;

and each of said receiver means including means to reject spurious signals; and each of said receivers includes selective masking means for selectively shaping a reception angle to admit only those beams received most directly, and not those received indirectly, thereby rejecting crosstalk from undesired neighboring transmissions;

with said selective masking means being formed of two or more masks of differing reception angles, said mask of the preferred reception angle being selectable by said user.

4. A multi-user multi-channel multi-transmitter information system of claim 3 in which said selection of the said preferred reception angle being by means for providing to the user a place to place a finger over the less desirable receiving mask.

* * * * *